United States Patent [19]
Daicho et al.

[11] Patent Number: 5,738,145
[45] Date of Patent: Apr. 14, 1998

[54] VALVE ASSEMBLY FOR GAS CYLINDER

[75] Inventors: Norio Daicho, Amagasaki; Keitaro Yonezawa, Kobe; Masakatsu Kawahara, Amagasaki; Noriaki Arai, Amagasaki; Teruo Hatori, Amagasaki, all of Japan

[73] Assignee: Kabushiki Kaisha Neriki, Hyogo, Japan

[21] Appl. No.: 853,414

[22] Filed: May 9, 1997

Related U.S. Application Data

[63] Continuation of Ser. No. 488,784, Jun. 8, 1995, abandoned.

[30] Foreign Application Priority Data

Jun. 24, 1994 [JP] Japan .................................. 6-142736
Oct. 5, 1994 [JP] Japan .................................. 6-241093

[51] Int. Cl.$^6$ .................................................. B65B 31/06
[52] U.S. Cl. .................................................. 137/878; 222/3
[58] Field of Search .................................. 137/861, 877, 137/878, 493, 497.8; 222/3; 141/18

[56] References Cited

U.S. PATENT DOCUMENTS

| | | |
|---|---|---|
| 3,885,589 | 5/1975 | Lung . |
| 4,210,168 | 7/1980 | Yonezawa . |
| 4,402,340 | 9/1983 | Lockwood . |
| 5,048,565 | 9/1991 | Oi . |
| 5,309,945 | 5/1994 | Sakai et al. . |

FOREIGN PATENT DOCUMENTS

| | | |
|---|---|---|
| 49-43951 | 12/1974 | Japan . |
| 5-215299 | 8/1993 | Japan . |
| 5215299 | 8/1993 | Japan . |
| 607 646 | 9/1978 | Switzerland . |

*Primary Examiner*—John Fox
*Attorney, Agent, or Firm*—Bacon & Thomas

[57] ABSTRACT

A gas inlet (4) an inlet passage (8), a stop valve (7), an outlet passage (9) and a gas outlet (5) are communicated orderly with one another within a valve casing (3). The outlet passage (9) is communicated with the inlet passage (8) through a gas charging passage (10). A check valve (11) for blocking a flow from the inlet passage (8) to the outlet passage (9) is arranged in the gas charging passage (10). When a vacant gas cylinder (1) is charged with a high-pressure gas, the charge gas is supplied to a gas charging mouthpiece (17) connected to the gas outlet (5) while the stop valve (7) is kept closed. Thereupon, an interior space (A) of the gas cylinder (1) is charged with the charge gas from the outlet (5) through the check valve (11) and the gas inlet (4) in order.

12 Claims, 16 Drawing Sheets

VALVE ASSEMBLY FOR GAS CYLINDER

This application is a Continuation of application Ser. No. 08/488,784, filed Jun. 8, 1995 now abandoned.

BACKGROUND OF THE INVENTION

1. Field of the Invention

The present invention relates to a valve assembly adapted to be attached to a gas cylinder containing a compressed gas and a liquefied gas for use in the taking-out and charging of such gases.

2. Description of the Prior Art

Generally, in such a valve assembly for a gas cylinder, as shown in a first conventional example illustrated in FIG. 18(a), a stop valve 107 is disposed between a gas inlet 104 and a gas outlet 105 within a valve casing 103.

In the above-mentioned valve assembly of the first conventional example, gas charging working for charging a vacant gas cylinder 101 with a new high-pressure gas is carried out in accordance with the following procedures. Firstly, a gas charging mouthpiece 117 is connected to the gas outlet 105 and a handle-wheel of the stop valve 107 is turned in the valve opening direction to open the stop valve 107, then the gas cylinder 101 is charged with the gas. After completion of the gas charging, the handle-wheel is turned in the valve closing direction to close the stop valve 107.

In the above-mentioned first conventional example, since it is necessary to turn the handle-wheel even in twice, namely in the valve opening direction and in the valve closing direction, for every gas charging working, there is such a problem that the turning of the handle-wheel takes much trouble and an efficiency of gas charging working is bad.

For solving the above-mentioned problem, the inventors of the present invention formerly proposed such techniques as disclosed in the Japanese Utility Model Publication No. 49-43951 (refer to as a second conventional example hereinafter) and the Japanese Patent Laid Open Publication No. 5-215299 (refer to as a third conventional example hereinafter).

In the second conventional example, as shown in FIG. 18(b), a gas charging opening 113 is formed at a different location of the external surface of the valve casing 103 from the location of the gas outlet 105 so as to communicate with the gas inlet 104, a plug 119 of a quick-acting coupling 116 provided at its opposite sides with check valves is threadably secured to the gas charging opening 113, and a socket 120 of the quick-acting coupling 116 is fixedly secured to a leading end of a gas charging mouthpiece. When the socket 120 of the mouthpiece is connected to the plug 119 of the valve assembly 102 at the time of gas charging, two checking members 111, 112 accommodated within these socket 120 and the plug 119 are pushed to each other to open the valve.

In the third conventional example, as shown in FIG. 18(c), a gas charging passage 210 is branched out from an inlet passage 208 within a valve casing 203, and the gas charging passage 210 is provided with a check valve 211 for blocking a gas flow from a gas inlet 204 to a gas charging connection opening 213.

In the above-mentioned second conventional example illustrated in FIG. 18(b), since it is not necessary to open and close a handle-wheel of the stop valve 107 for the gas charging working, advantageously the working becomes easy. There is, however, the following problems associated therewith.

Since the valve assembly 102 becomes large in size because of the great projecting of the plug 119 from the external surface of the valve casing 103, it is impossible to cover the valve assembly 102 with a previously-used protection cap.

In addition, since the quick-acting coupling 116 is constituted so as to hold the two checking members 111, 112 in the valve open state by connecting the socket 120 to the plug 119, when the socket 120 is separated from the plug 119 after completion of the gas charging into the gas cylinder 101, the separating is to be performed under such a condition that the charged gas pressure within the gas cylinder 101 acts on them. Therefore, a large force is required for separation of the quick-acting coupling 116, so that the separating becomes very difficult to lower the efficiency of the gas charging working.

Further, since the previously-used gas charging mouthpiece 117 described in the first conventional example of FIG. 18(a) can't be employed as the gas charging mouthpiece, it becomes necessary to newly provide a dedicated gas charging mouthpiece provided with the socket 120. When two kinds of gas cylinders including the gas cylinder provided with the valve assembly according to the first conventional example and the gas cylinder provided with the valve assembly according to the second conventional example mixedly exist at a gas charging site, it becomes necessary to classify these gas cylinders in accordance with the kinds of the valve assemblies because the gas charging mouthpieces to be connected are different from each other. Accordingly, the efficiency of the gas charging working further lowers by that classifying trouble.

In the above-mentioned third conventional example illustrated in FIG. 18(c), similarly to the above-mentioned second conventional example, since it is not necessary to turn the handle-wheel of the stop valve 207 for opening and closing it at the time of the gas charging working, the working becomes easy. Additionally, at the completion of the gas charging working for the gas cylinder 201, since a reverse flow from the gas cylinder 201 to the gas charging connection opening 213 is blocked by the automatic closing of the check valve 211 by a checking spring, it becomes possible to detach the gas charging mouthpiece under the pressure released condition. Therefore, it becomes possible to detach the mouthpiece with a little effort, so that the gas charging working becomes easier.

But, there still remains the following problem associated with the third conventional example.

Since there is provided the gas charging connection opening 213, it is necessary to make a gas charging nozzle project from the valve casing 203. Therefore, the valve casing 203 can't help becoming large in size. When the previously-used gas charging mouthpiece 117 of FIG. 18(a) is attempted to be made connectable to the gas charging connection opening 213, since a projecting length of the nozzle becomes great in accordance with a thread dimension and so on of the connecting portion, an external dimension of the valve casing 203 becomes larger. Accordingly, it becomes impossible to cover the valve assembly 202 with a previously-used protection cap.

SUMMARY OF THE INVENTION

It is an object of the present invention to provide a valve assembly which enables to perform a gas charging working effectively and which can be manufactured compactly.

For accomplishing the above-mentioned object, for example as shown in each of FIGS. 1 and 2 and FIGS. 3 through 6, or in each of FIGS. 7 and 8 and FIGS. 9 and 10 or FIGS. 11 through 17 respectively, a valve assembly according to the present invention is constituted as follows.

Between a gas inlet 4 and a gas outlet 5 within a valve casing 3 there is provided a stop valve 7. A gas charging passage 10 for making the gas outlet 5 communicate with an interior space A of a gas cylinder 1 is arranged in parallel relative to the stop valve 7. The gas charging passage 10 is provided with a check valve 11 which serves to block a flow from the interior space A of the gas cylinder 1 to the gas outlet 5. A gas charging mouthpiece 17 is adapted to be attached to the gas outlet 5.

The present invention functions as follows, for example as shown in FIGS. 1 and 2 (or in FIGS. 7 and 8, or in FIGS. 9 and 10).

When taking out the gas, the stop valve 7 is actuated to an opening side, so that a high-pressure gas within the gas cylinder 1 can be taken out from the gas outlet 5 through the stop valve 7.

When charging the vacant gas cylinder 1 with a new high-pressure gas, the gas charging mouthpiece 17 is connected to the gas outlet 5 so as to supply the high-pressure charge gas through the mouthpiece 17 leaving the stop valve 7 closed. Thereupon, the charge gas flows from the gas outlet 5 through the check valve 11 and the gas inlet 4 in order, so that the interior space A of the gas cylinder 1 is charged with the gas.

When the gas charging working is completed, since the check valve 11 is automatically closed by a checking spring and the like so as to block a reverse flow from the gas cylinder 1 to the gas outlet 5, it becomes possible to detach the gas charging mouthpiece 17 under the pressure released condition by discharging the gas within the mouthpiece 17 outside and so on. Thereby, the mouthpiece 17 can be detached with a little effort.

Since the present invention is constituted and functions as mentioned above, the following advantages can be obtained.

At the time of gas charging working, since it is not necessary to open and close the stop valve, the charging working becomes easy. When the gas charging working for the gas cylinder is completed, since the check valve serves to block the reverse flow from the gas cylinder to the gas outlet, it becomes possible to detach the gas charging mouthpiece under the pressure released condition. Therefore, the mouthpiece can be detached with a little effort, so that the gas charging working becomes easier.

When the above-mentioned advantage is obtained, since the gas outlet can be used for the gas charging, it is not necessary to newly provide a gas charging connection opening. Therefore, a nozzle for the connection opening can be omitted from the valve casing and the valve casing can be manufactured small in diameter and low in height, so that it becomes possible to use the previously-used protection cap for the valve assembly of the present invention.

Further, since the gas outlet can be used for the gas charging as mentioned above, it becomes possible to use the previously-used gas charging mouthpiece as it is. Therefore, even when two kinds of gas cylinders including the gas cylinder provided with the conventional valve assembly as shown in FIG. 18(a) and the gas cylinder provided with the valve assembly according to the present invention are mixedly provided, it is not necessary to classify these gas cylinders in accordance with the type of the valve assembly, so that the gas charging working can be carried out effectively.

Incidentally, when the following constitution is added to the above-mentioned constitution, the following advantages can be obtained additionally.

When the check valve is disposed in parallel with a stop valve seat between a stop valve chamber and an inlet passage of the stop valve, since a space of a peripheral wall portion of the stop valve chamber can be used as a mounting space for the check valve, the valve casing can be manufactured compactly.

Also when the check valve is disposed in parallel with the stop valve seat between the outlet passage and the inlet passage, since a space of a bottom wall portion of the stop valve chamber can be used as a mounting space for the check valve, the valve casing can be manufactured compactly and low in height.

When a gas charging passage is arranged in parallel with the inlet passage and the check valve is disposed at an end portion of the gas charging passage, since the projecting of the check valve from the valve casing can be restrained, the valve assembly becomes more compact.

When the valve casing is enlarged out substantially in the opposite direction to a boss portion to which the check valve for the gas charging is mounted and another check valve for holding a residual pressure is mounted to a midway portion of the gas outlet passage formed in the enlarged portion, a projecting length of an outlet nozzle from the valve casing becomes short in spite of the provision of another check valve. Therefore, also due to this short projecting length, the valve assembly becomes compact and it becomes possible to cover the valve assembly with a previously-used protection cap.

When a pressure reducing valve is disposed between the stop valve and the gas outlet and the check valve is disposed in parallel with these stop valve and pressure reducing valve, the above-mentioned respective advantages of the present invention can be obtained even in the case of the taking-out of the high-pressure gas within the gas cylinder under a pressure reduced condition.

When there is provided means for forcibly open the check valve, the following advantage can be obtained. That is, when vacuum suction for the gas cylinder is performed prior to the charging working for the vacant gas cylinder, it becomes possible to perform the vacuum suction from the gas outlet with the stop valve closed by forcibly opening the check valve. Therefore, it is possible to omit the opening actuation of the stop valve.

BRIEF DESCRIPTION OF THE DRAWINGS

The above and other objects, advantages and features of the invention will be become apparent when considered with the following detailed description and accompanying drawings wherein:

FIG. 1 is a vertical sectional view of the valve assembly;

FIG. 2 is a system diagram of the valve assembly;

FIG. 7 is a view corresponding to FIG. 1;

FIG. 8 is a partial sectional view of the valve assembly of FIG. 7 viewed from the left side;

FIG. 9 is a view corresponding to FIG. 3;

FIG. 10 is a system diagram corresponding to FIG. 2;

FIG. 18(b) shows a second conventional example and is a view corresponding to FIG. 2; and FIG. 18(c) shows a third conventional example and is a view corresponding to FIG. 2.

DESCRIPTION OF THE PREFERRED EMBODIMENTS

Figure 1:
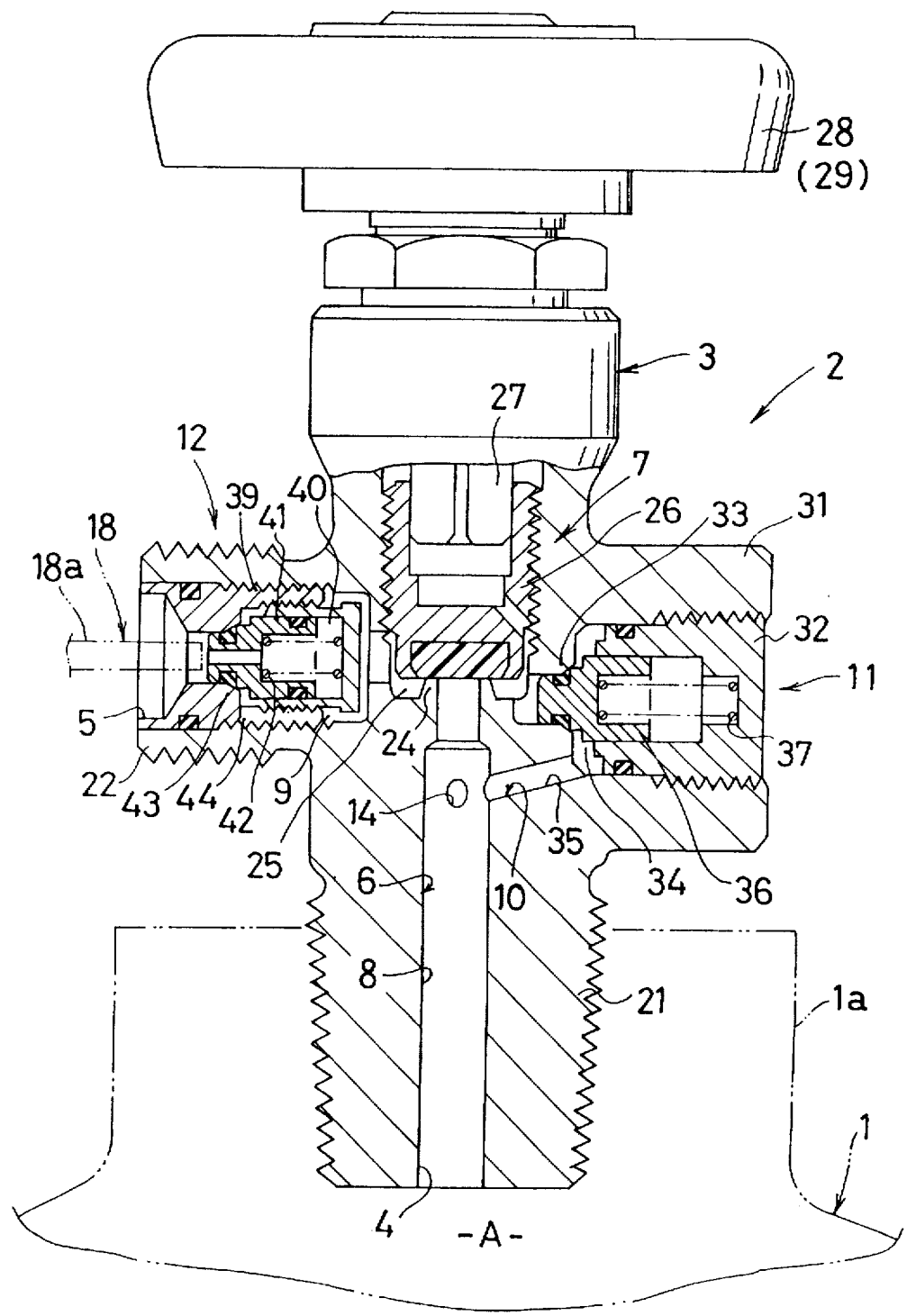
FIGS. 1 and 2 show a first embodiment of a valve assembly for a gas cylinder of the present invention.
Figure 2:
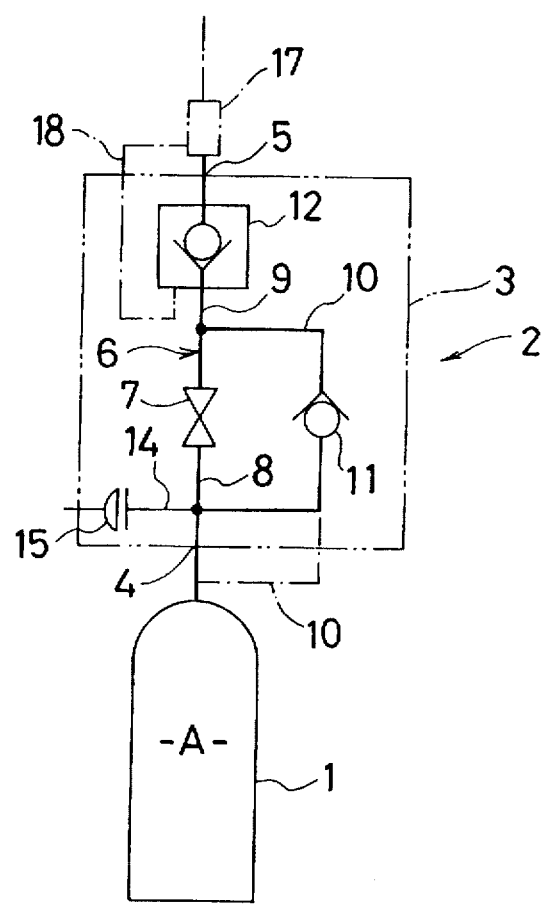

FIGS. 1 and 2 show a first embodiment of the present invention. Firstly, a schematic constitution of a valve assembly will be explained with reference to a system diagram of FIG. 2.

A valve assembly 2 fixedly secured to a gas cylinder 1 has a valve casing 3 provided with a gas inlet 4 and a gas outlet 5 formed in its external surface. A stop valve 7 is disposed in a gas taking-out passage 6 extending from the gas inlet 4 to the gas outlet 5. The gas taking-out passage 6 comprises an inlet passage 8 and an outlet passage 9.

A gas charging passage 10 for making the gas outlet 5 communicate with an interior space A of the gas cylinder 1 is arranged in parallel to the stop valve 7. The gas charging passage 10 is provided with a first check valve 11 for blocking a flow from the interior space A of the gas cylinder 1 to the gas outlet 5.

Further, the outlet passage 9 is provided with a second check valve 12 for holding a residual pressure. This second check valve 12 is mounted thereto so as to block flow from the gas outlet 5 to the stop valve 7 and the first check valve 11. Incidentally, a safety valve 15 of the bursting plate type is disposed in a relief passage 14 branched out from the inlet passage 8.

A gas charging mouthpiece 17 is made connectable to the gas outlet 5. In this mouthpiece 17, there is provided a forcible valve opening means 18 for forcibly opening the second check valve 12.

The valve assembly 2 is used as follows.

When taking out the gas, the stop valve 7 is opened so that the high-pressure gas within the gas cylinder 1 can be taken out from the gas outlet 5 through the stop valve 7 and the second check valve 12 in order.

During the taking-out of the gas, when a reversely flowing gas has entered the gas outlet 5 due to any reason, since the second check valve 12 serves to block the reverse flow, the interior of the gas cylinder 1 can be prevented from being contaminated by the reversely flowing gas.

When a residual pressure within the gas cylinder 1 has decreased to a predetermined value due to repetition of the gas taking-out, the second check valve 12 is closed automatically by a checking spring (herein, not illustrated). Thereby, further gas taking-out is prevented, so that the residual pressure within the gas cylinder 1 is maintained at the predetermined pressure. As a result, even when the stop valve 7 is kept open by mistake, it can be prevented that the atmosphere enters the vacant gas cylinder 1.

When charging the vacant gas cylinder 1 with the new high-pressure gas, the gas charging mouthpiece 17 is connected to the gas outlet 5 leaving the stop valve 7 closed. Thereupon, the second check valve 12 is opened by manipulating with the forcible valve opening means 18 mounted to the mouthpiece 17 (or by a pressure of the charge gas itself). Subsequently, the high-pressure charge gas is supplied from the mouthpiece 17. Thereupon, the charge gas flows from the gas outlet 5 through the second check valve 12 and the first check valve 11 in order and then the interior space A of the gas cylinder 1 is charged with the gas.

A concrete constitution of the valve assembly 2 will be explained by FIG. 1 with reference to FIG. 2.

A threaded leg portion 21 of the valve casing 3 of the valve assembly 2 is threadably secured to a neck portion 1a of the gas cylinder 1. During the transportation and the storage of the gas cylinder 1, a protection cap (not illustrated) is threadably secured to an external peripheral portion of the neck portion 1a so as to cover the valve assembly 2 with the protection cap.

The gas inlet 4 is opened in the lower surface of the threaded leg portion 21. An outlet nozzle 22 is projected leftwards from a midway-height portion of the valve casing 3 and the gas outlet 5 is opened in the outlet nozzle 22.

Within the valve casing 3, the gas inlet 4 is connected to the gas outlet 5 through the inlet passage 8, a stop valve seat 24, a stop valve chamber 25 and the outlet passage 9 in order. A closure member 26 is inserted into the stop valve chamber 25 so as to be raised and lowered, and the closure member 26 is adapted to be opened and closed with respect to the stop valve seat 24 by a spindle 27 and a handle 28. These spindle 27 and handle 28 constitute an opening and closing means 29.

Further, a boss portion 31 is projected rightwards from the valve casing 3. The first check valve 11 is mounted to a cover bolt 32 threadably secured to the boss portion 31. That is, between the stop valve chamber 25 and the inlet passage 8 there are provided a first check valve seat 33, a first check valve chamber 34 and a communicating passage 35 in order. A first checking member 36 inserted into the first check valve chamber 34 is brought into contact with the first check valve seat 33 by a first checking spring 37. At the time of gas charging, the first checking member 36 is separated from the first check valve seat 33 against the first checking spring 37 by a pressure which has entered the stop valve chamber 25 from the gas outlet 5.

The gas charging passage 10 comprises an outlet passage 9, the stop valve chamber 25, the first check valve chamber 34, the communicating passage 35 and an inlet passage 8 and is arranged in parallel to the stop valve seat 24 between the gas outlet 5 and the gas inlet 4.

The second check valve 12 is accommodated within a cassette tube 39 internally fitted into the outlet nozzle 22.

That is, a tubular second checking member 41 inserted into a second checking valve chamber 40 is brought into valve closing contact with a second check valve seat 43 by an inside pressure of the valve chamber 40 and a second checking spring 42. At the time of gas taking-out, the second checking member 41 is separated from the second checking valve seat 43 against the second checking spring 42 by a pressure gas which has flown into a second check valve inlet passage 44 from the stop valve chamber 25.

When the gas charging mouthpiece 17 (herein, not illustrated) is connected to the outlet nozzle 22, the second checking member 41 is separated from the second check valve seat 43 by an valve opening member 18a of the forcible valve opening means 18.

According to the above-mentioned valve assembly 2, the following advantages can be obtained.

Figure 18:
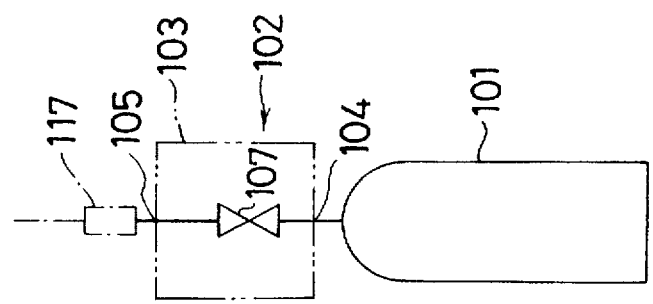
FIG. 18 (a) shows a first conventional example and is a view corresponding to FIG. 2.
Figure 18:
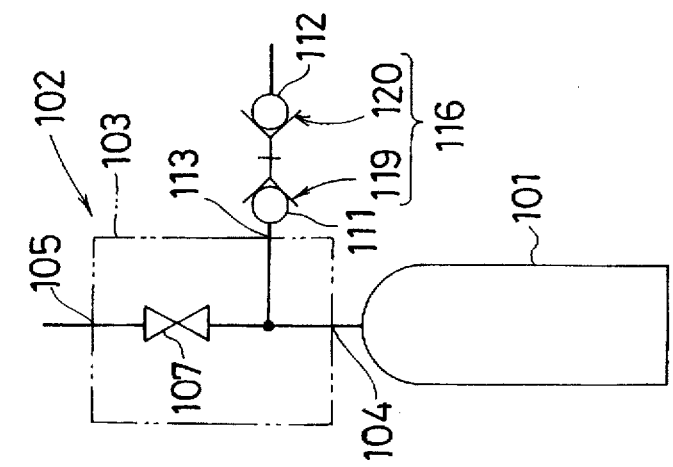
Figure 18:
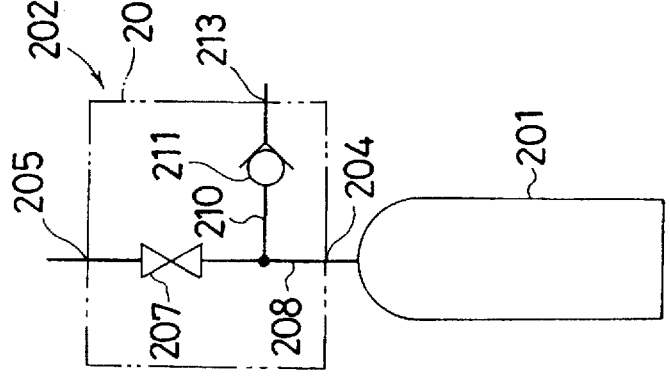

Since the gas taking-out and the gas charging can be carried out by using the one gas outlet 5, it is not necessary to arrange the second conventional gas charging opening 113 of FIG. 18(b) or the gas charging connection opening 213 of FIG. 18(c) in the valve casing 3 and the gas charging nozzle can be omitted from the valve casing 3. Therefore, the valve casing 3 can be manufactured small in diameter and low in height. Further, since a space of a peripheral wall portion of the stop valve chamber 25 can be used as a mounting space for the first check valve 11, the valve casing 3 can be manufactured more compactly.

Further, since it becomes also unnecessary to form in the protection cap a through-hole for inserting the gas charging mouthpiece to the gas charging opening 113 of or the gas charging connection opening 213 of the conventional example, a previously-used protection cap can be used as it is. In addition, since the gas charging can be carried out by using the gas outlet 5, as the gas charging mouthpiece 17 the previously-used one shown in FIG. 18(a) can be used as it is.

Incidentally, a safety valve of the bursting plate type (herein, not illustrated, but refer to the symbol 15 in FIG. 2) is arranged at the endmost portion of a relief passage 14 branched out from the inlet passage 8. The safety valve is mounted to the boss portion projected from the valve casing 3 in the backside direction in FIG. 1. Instead of this, the safety valve may be mounted to a right boss portion in FIG. 1 and the first check valve may be mounted to a backside boss portion.

FIGS. 3 through 12 show second through ninth embodiments of the present invention. In these embodiments, component members having the same functions as those in first embodiment will be explained by using the same symbols in principle.

Figure 3:
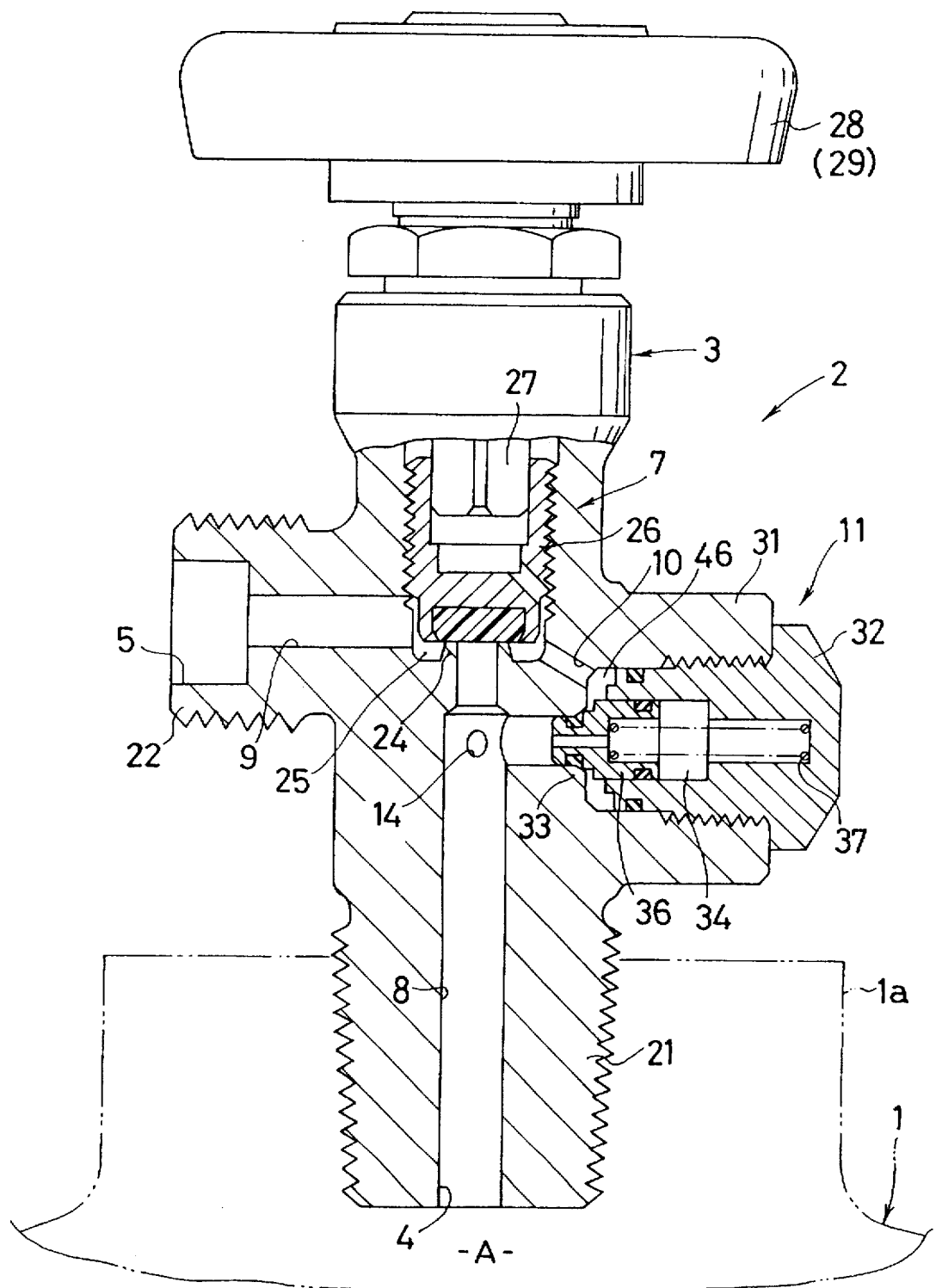
FIG. 3 shows a second embodiment of a valve assembly thereof and is a view corresponding to FIG. 1.

FIG. 3 shows the second embodiment.

In this case, the first check valve 11 has substantially the same constitution as that of the second check valve in the first embodiment. That is, the stop valve chamber 25 is communicated with the inlet passage 8 through a first check valve inlet passage 46 and the first check valve seat 33 in order. The tubular first check valve member 36 inserted into the first check valve chamber 34 is brought into valve closing contact with the first check valve seat 33 by the inside pressure of the valve chamber 34 and the first checking spring 37. At the time of the gas charging, the first checking member 36 is separated from the first check valve seat 33 against the first checking spring 37 by the pressure gas which has entered the first check valve inlet passage 46.

Incidentally, though the second check valve in the first embodiment is omitted herein, it may be disposed within the outlet nozzle 22 or at a midway height portion or the like of the valve casing 3.

Figure 4:
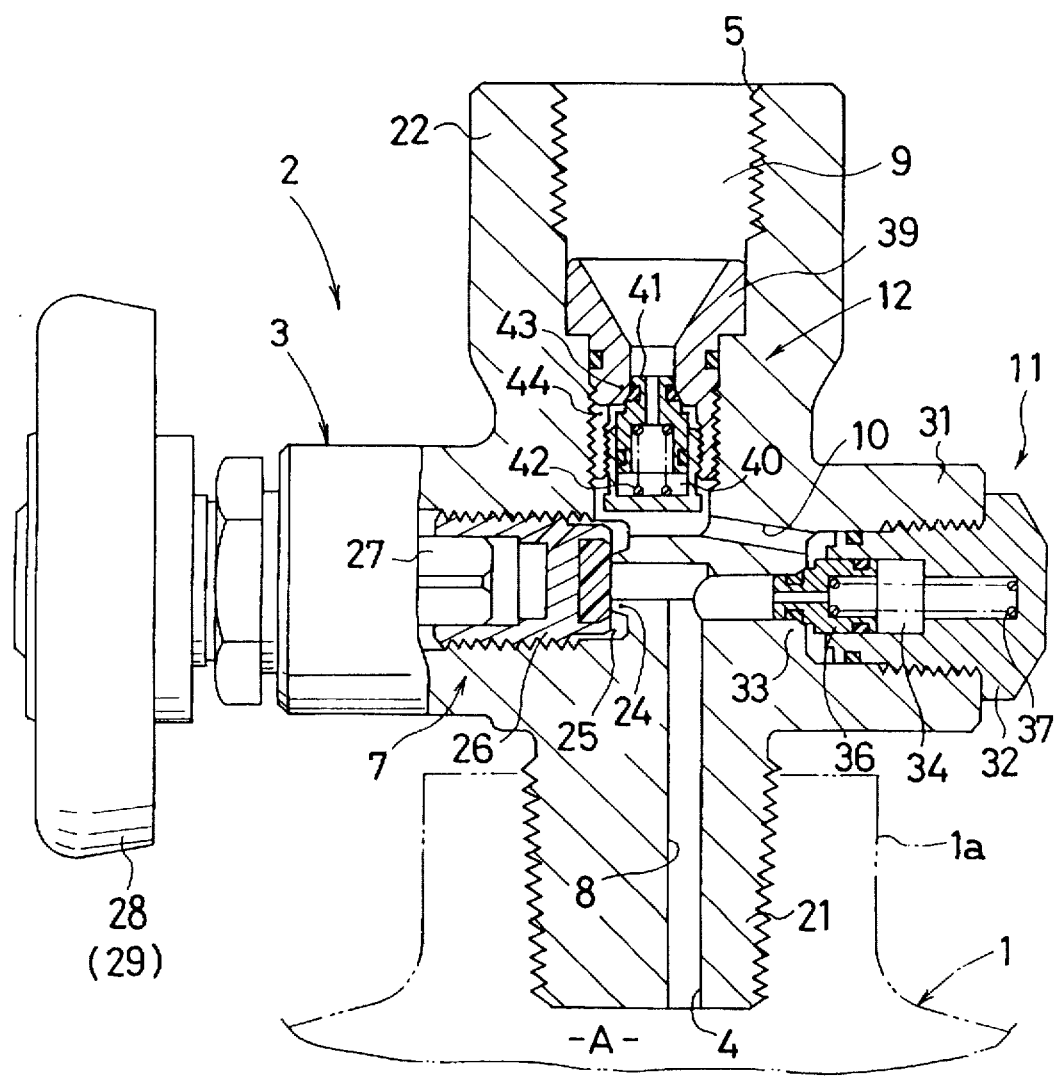
FIG. 4 shows a third embodiment of a valve assembly thereof and is a view corresponding to FIG. 1.

FIG. 4 shows the third embodiment.

In this case, the outlet nozzle 22 is projected upwards from the valve casing 3. The stop valve chamber 25 of the stop valve 7 is arranged horizontally, and the spindle 27 and the handle 28 are arranged so as to project leftwards. Within the outlet nozzle 22 there is provided the same second check valve 12 as that of the first embodiment. The first check valve 11 is disposed on the opposite side to the stop valve chamber 25 and arranged in parallel to the stop valve seat 24 between the outlet passage 9 and the inlet passage 8.

According to this embodiment, since a space of a bottom wall portion of the stop valve chamber 25 can be used as a mounting space for the first check valve 11, the valve casing 3 can be manufactured compactly and low in height.

Figure 5:
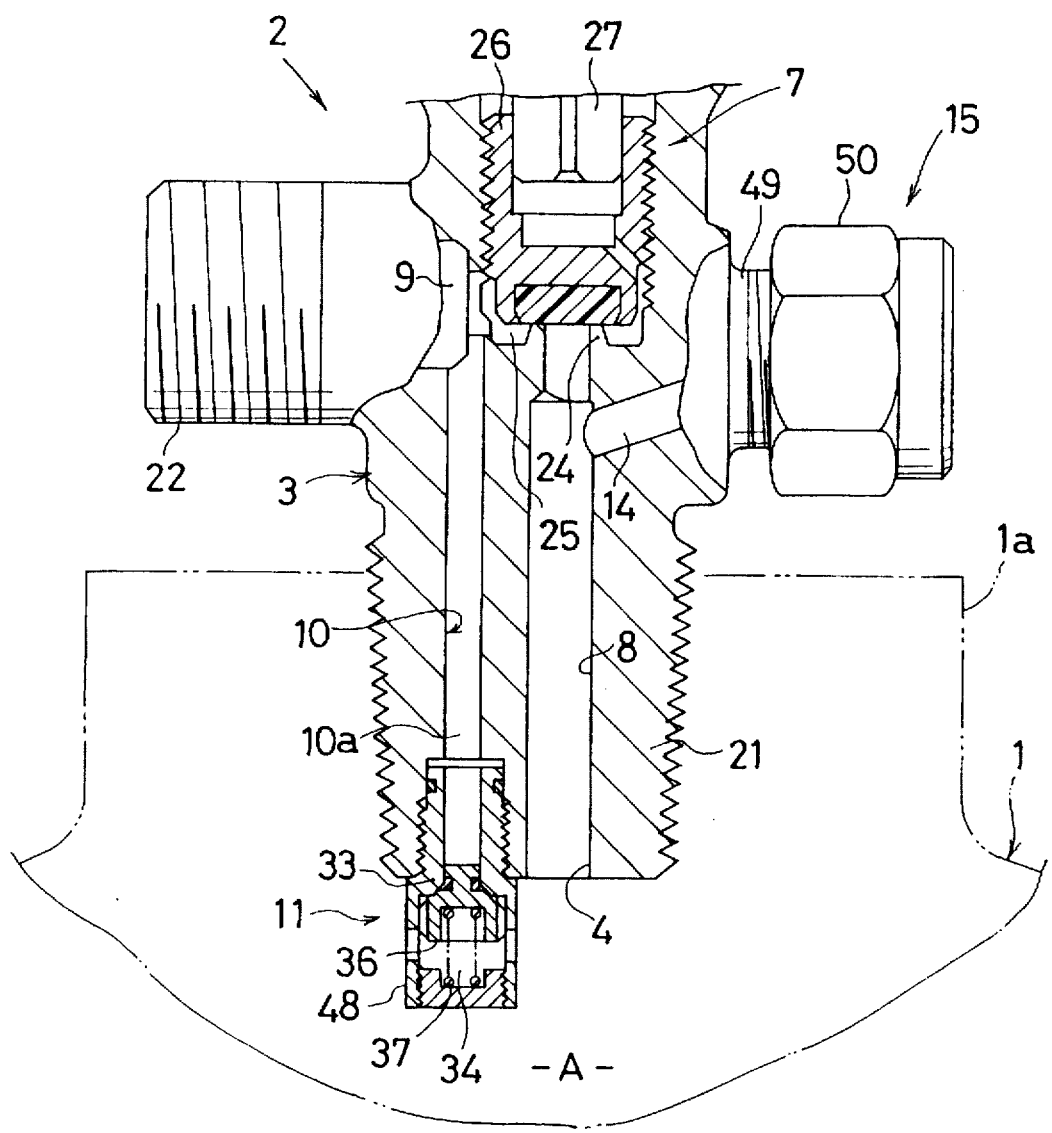
FIG. 5 shows a fourth embodiment of a valve assembly thereof and is a partial view corresponding to FIG. 1.

FIG. 5 shows the fourth embodiment.

The gas charging passage 10 is arranged in parallel to the inlet passage 8, and an endmost portion 10a of the gas charging passage 10 is opened in the lower surface of the threaded leg portion 21 (refer to a figure depicted by the alternate long and two short dashes line in FIG. 2). The first check valve 11 is arranged in the endmost portion 10a. This first check valve 11 comprises a cassette tube 48 fixedly secured to the threaded leg portion 21, the first checking member 36 mounted to the cassette tube 48 and the first checking spring 37 for bringing the first checking member 36 into valve closing contact with the first check valve seat 33.

Incidentally, the safety valve 15 of the bursting plate type is accommodated within a boss portion 49 projected rightwards from the valve casing 3 and a cap nut 50. The symbol 14 designates a relief passage.

In this fourth embodiment, since the cassette tube 48 is projected into the interior space A of the gas cylinder 1, it becomes possible to prevent external enlargement of the valve casing 3 which might be caused by the first check valve 11.

Figure 6:
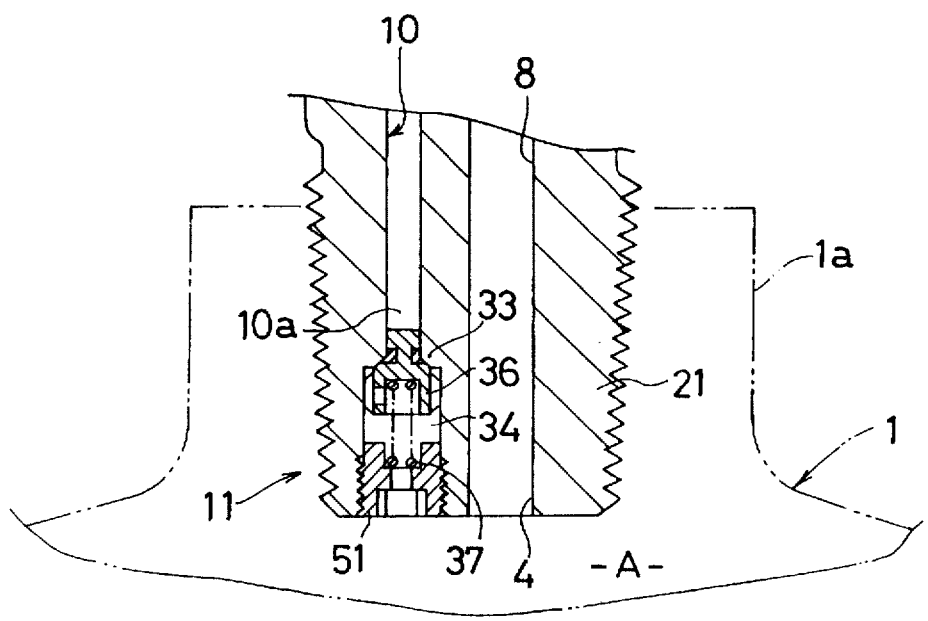
FIG. 6 shows a fifth embodiment of a valve assembly thereof and is a view corresponding to FIG. 5.

FIG. 6 shows the fifth embodiment, which is obtained by modifying the fourth embodiment shown in FIG. 5 as follows. The first check valve seat 33 and the first check valve chamber 34 are formed orderly in the endmost portion 10a of the gas charging passage 10. The first checking spring 37 for urging the first checking member 36 to the first check valve seat 33 is retained by a tubular spring retainer bolt 51.

In this fifth embodiment, since the first check valve 11 doesn't project from the valve casing 3, an external dimension of the valve assembly becomes smaller.

Figure 7:
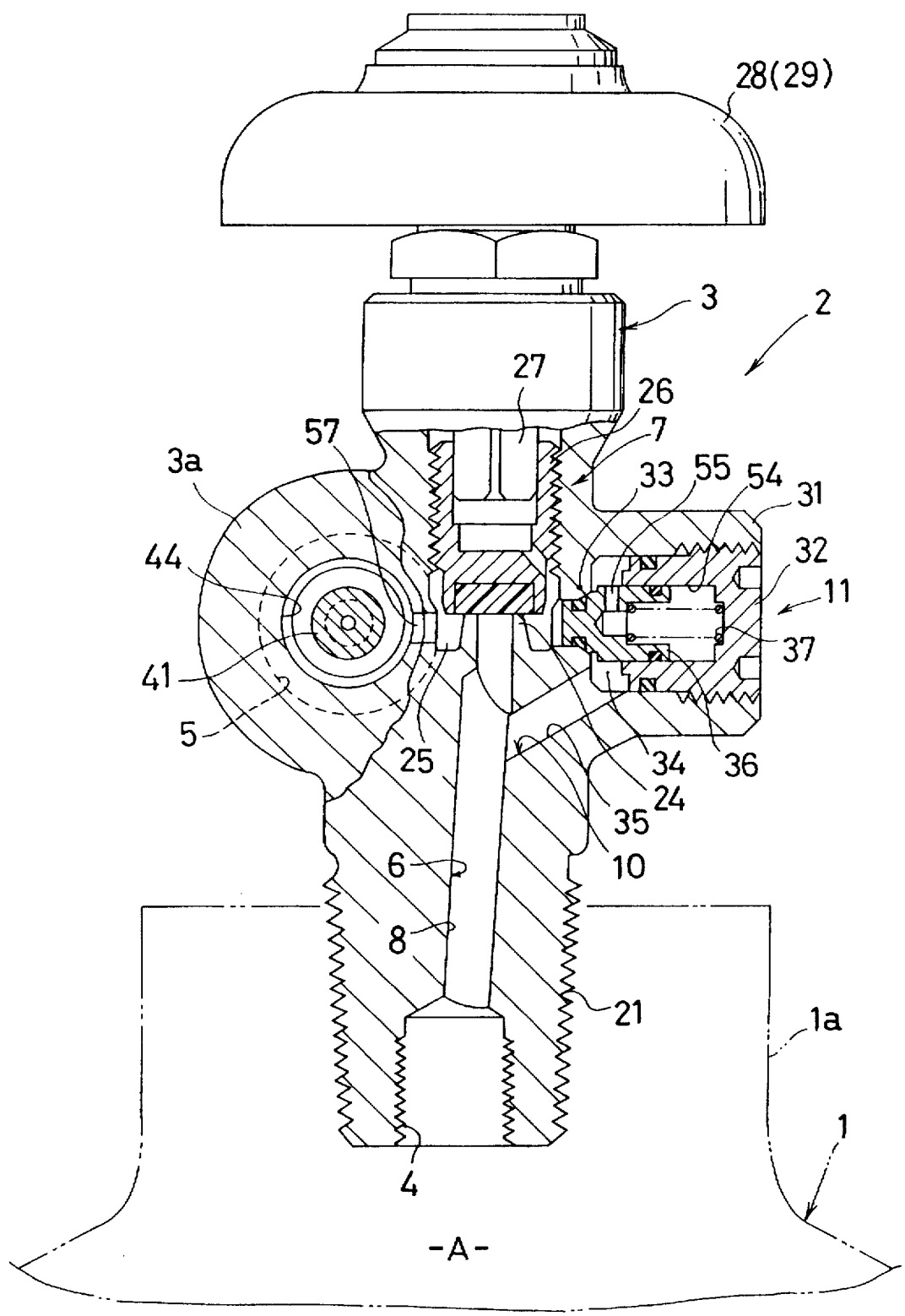
FIGS. 7 and 8 show a sixth embodiment of a valve assembly thereof.
Figure 8:
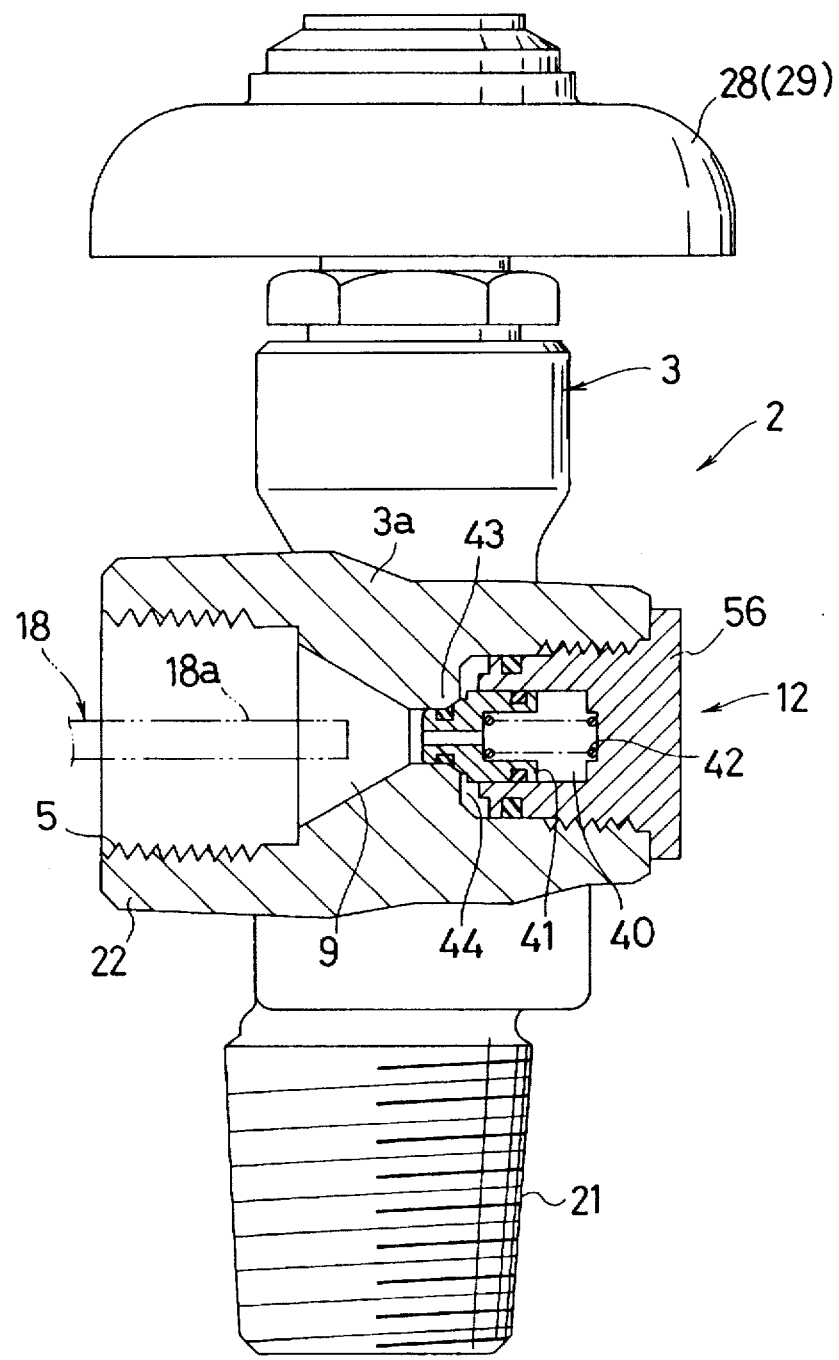

FIGS. 7 and 8 show the sixth embodiment. FIG. 7 is a view corresponding to FIG. 1, and FIG. 8 is a partial sectional view of the left side of FIG. 7.

The boss portion 31 is projected outwards horizontally from a peripheral wall of the stop valve chamber 25, and the first check valve 11 is mounted to the boss portion 31. That is, as shown in FIG. 7, the first checking member 36 is inserted into a cylindrical bore 54 of the cover bolt 32. An interior space of the cylindrical bore 54 is communicated with the first check valve chamber 34 by a through-hole 55 of the first checking member 36.

In addition, as shown in FIGS. 7 and 8, the valve casing 3 is swelled out from a peripheral wall of the stop valve chamber 25 substantially in the opposite direction to the projecting direction of the boss portion 31. The outlet passage 9 is formed in that swelled out portion 3a. The outlet nozzle 22 is formed in a peripheral wall of the endmost portion of the outlet passage 9. Further, the second check valve 12 is mounted to a midway portion of the outlet passage 9. That is, another cover bolt 56 is fixedly secured to the swelled-out portion 3a, and the second checking member 41 is hermetically inserted in to the second check valve chamber 40 within another bolt 56. The second check valve chamber 40 is communicated with the gas outlet 5, and the stop valve chamber 25 is communicated with the second check valve inlet passage 44 through a communication hole 57.

Similarly to the first embodiment (refer to FIGS. 1 and 2), under a condition that a pressure within the interior space A of the gas cylinder 1 exceeds a predetermined value, the second checking member 41 is moved to its opened position against the checking spring 42 by a pressure of the gas which has entered the second check valve inlet passage 44 through the stop valve chamber 25. When the pressure of the interior space A falls to the above-mentioned predetermined value, the second checking member 41 is automatically moved to its closed position by the checking spring 42. Further, when the reversely flowing gas has entered the gas outlet 5 from outside, the reversely flowing gas enters the second check valve chamber 40, so that the second checking member 41 is strongly pushed onto the second check valve sea t 43 by the entered gas pressure and the checking spring 42. Thereby, the reversely flowing gas is prevented from entering the gas cylinder 1. Incidentally, when charging the vacant gas cylinder 1 with the new gas, the second checking member 41 is to be moved to its opened position by a valve opening member 18a of the forcible valve opening means 18 arranged in the gas charging mouthpiece.

In this sixth embodiment, since a portion of the valve casing 3 is swelled out substantially in the opposite direction to the boss portion 31 to which the first check valve 11 is mounted and the second check valve 12 is mounted to the midway portion of the gas outlet 9 formed in that swelled-out portion 3a, a projecting length of the outlet nozzle 22 from the valve casing 3 is short even in the case of provision of the second check valve 12.

Figure 9:
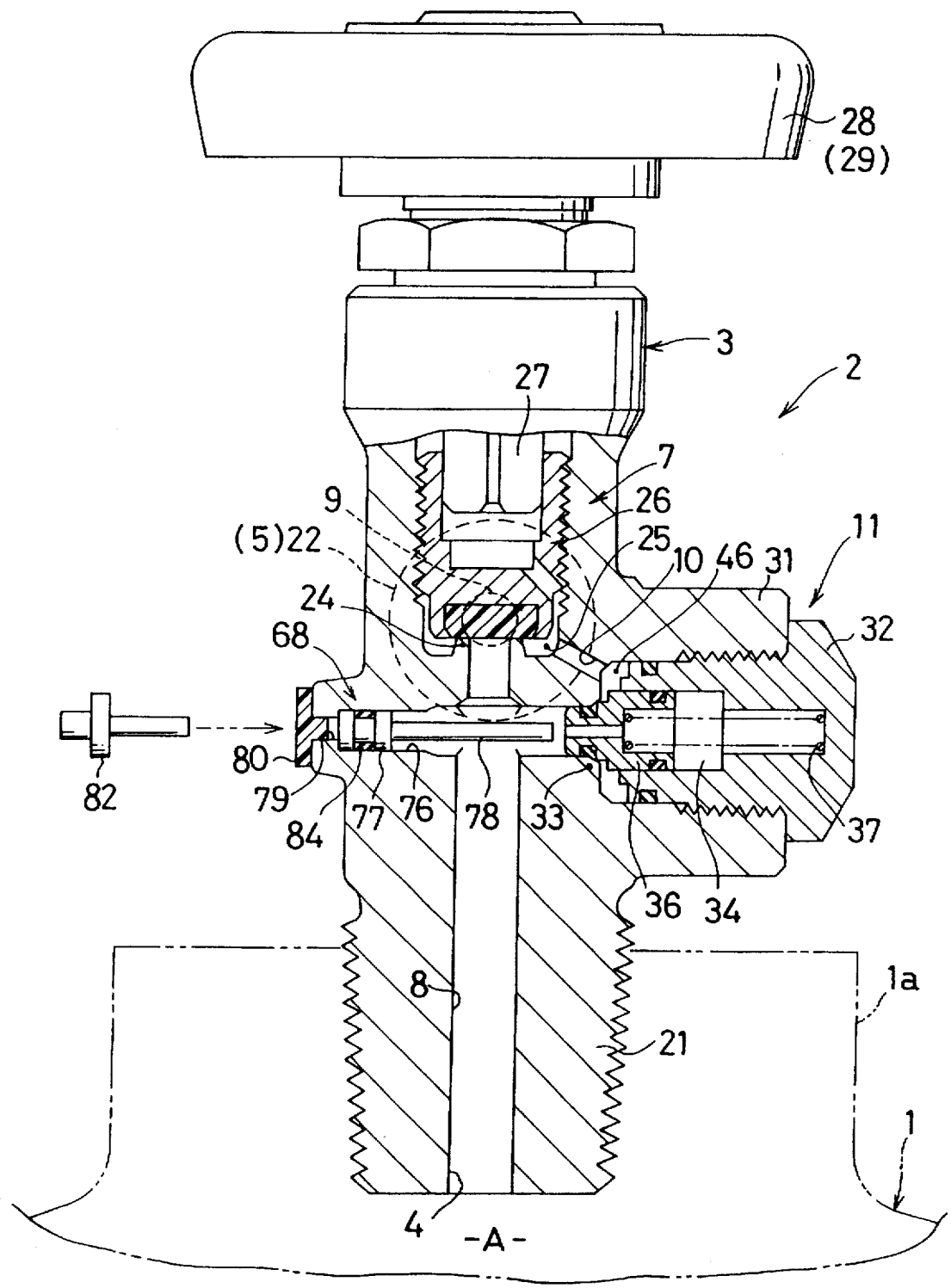
FIGS. 9 and 10 show a seventh embodiment of a valve assembly thereof.
Figure 10:
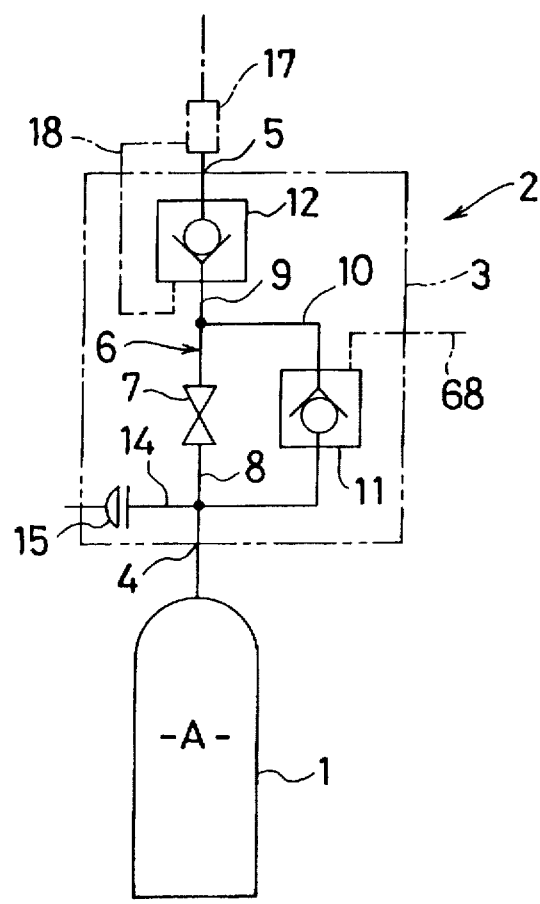

FIGS. 9 and 10 show the seventh embodiment. FIG. 9 shows such a valve assembly as obtained by adding means for forcibly opening the first check valve to the valve assembly of FIG. 3. FIG. 10 is a system diagram.

As shown in FIG. 10, in addition to the forcible valve opening means 18 for the second check valve 12, there is provided another means 68 for forcibly opening the first check valve 11.

That another forcible valve opening means 68 has a cylinder bore 76 arranged in series with respect to the first check valve chamber 34 and the first check valve seat 33 and a piston 77 hermetically inserted into the cylinder bore 76. A piston rod 78 projected rightwards from the piston 77 is made to face the first checking member 36, and the left end surface of the piston 77 is made to face an outside space of the valve casing 3 through a communication port 79. The communication port 79 is covered with a dust-proof cap 80.

When carrying out the vacuum suction for the interior of the vacant gas cylinder 1 prior to the gas charging for the gas cylinder 1, the valve assembly is operated as follows. Firstly, the dust-proof cap 80 is detached from the communication port 79 under a condition that the stop valve 7 is held in the closed state. Subsequently, an actuation member 82 is inserted from the communication port 79 into the cylinder bore 76 so as to separate the first checking member 36 from the first check valve seat 33 by the actuating member 82 through the piston 77 and the piston rod 78. Under this condition, the vacuum suction is carried out through the gas charging mouthpiece 17 connected to the gas outlet 5 of the outlet nozzle 22. Thereupon, the residual gas within the gas cylinder 1 is sucked outside through the gas inlet 4, an inside of the first check valve seat 33, the first check valve inlet passage 46, the stop valve chamber 25, the outlet passage 9 and the gas outlet 5 in order. Incidentally, prior to the vacuum sucking, it is preferable to actuate also the second check valve 12 so as to be opened by the forcible valve opening means 18.

Additionally, during the vacuum suction, the actuation member 82 may be detached from the communication port 79. That is, the piston 77 is pushed to the valve opening side on the right side by a differential pressure between an atmospheric pressure on the side of the communication port 79 and a negative pressure on the side of the inlet passage 8 and held in the valve opened posture by a friction force of an O-ring 84. Incidentally, in order to strongly hold the actuation member 82 in the valve opened posture, a suitable holding member (not illustrated) may be disposed between the actuation member 82 and the valve casing 3.

Figure 11:
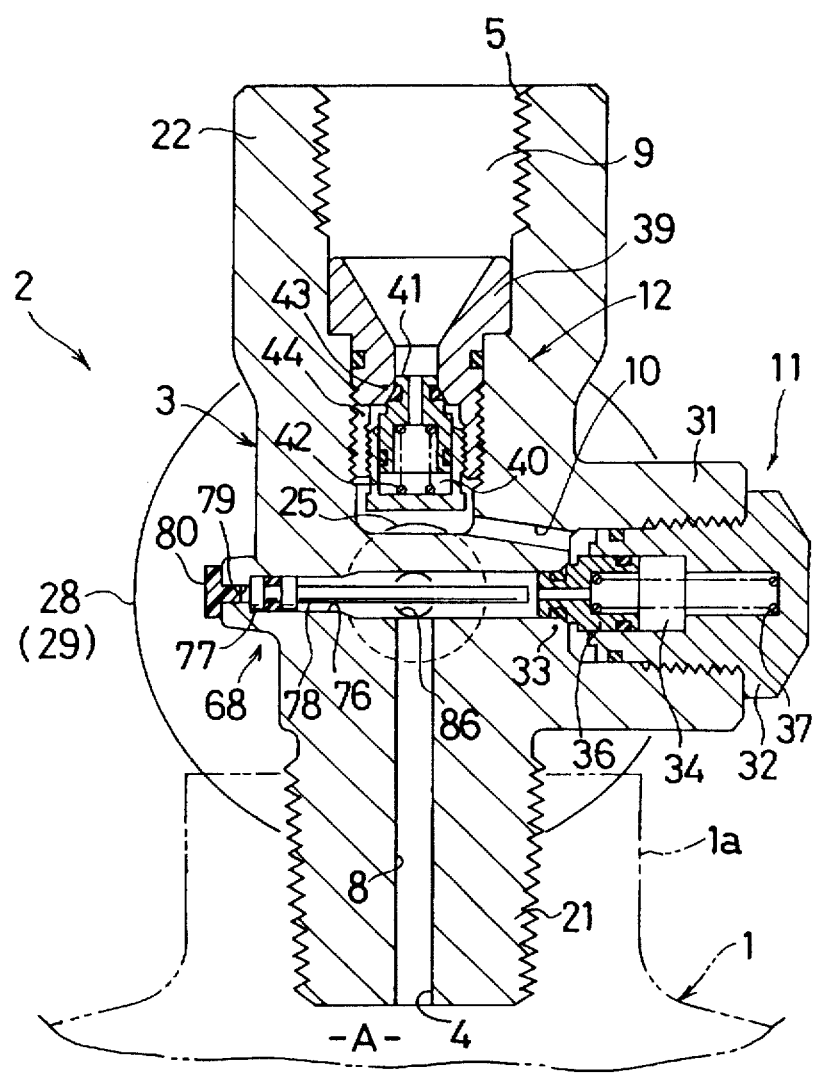
FIG. 11 shows an eighth embodiment of a valve assembly thereof and is a view corresponding to FIG. 4.

FIG. 11 shows the eighth embodiment and shows such a valve assembly as obtained by adding another forcible valve opening means 68 to the valve assembly of FIG. 4.

In this case, the stop valve chamber 25 and the handle 28 are disposed behind the valve casing 3, and the cylinder bore 78 and the communication port 79 of another forcible valve opening means 68 are formed at a midway height portion of the valve casing 3. Incidentally, the cylinder bore 76 and the stop valve chamber 25 are communicated with each other through a valve seat port 86.

Figure 12:
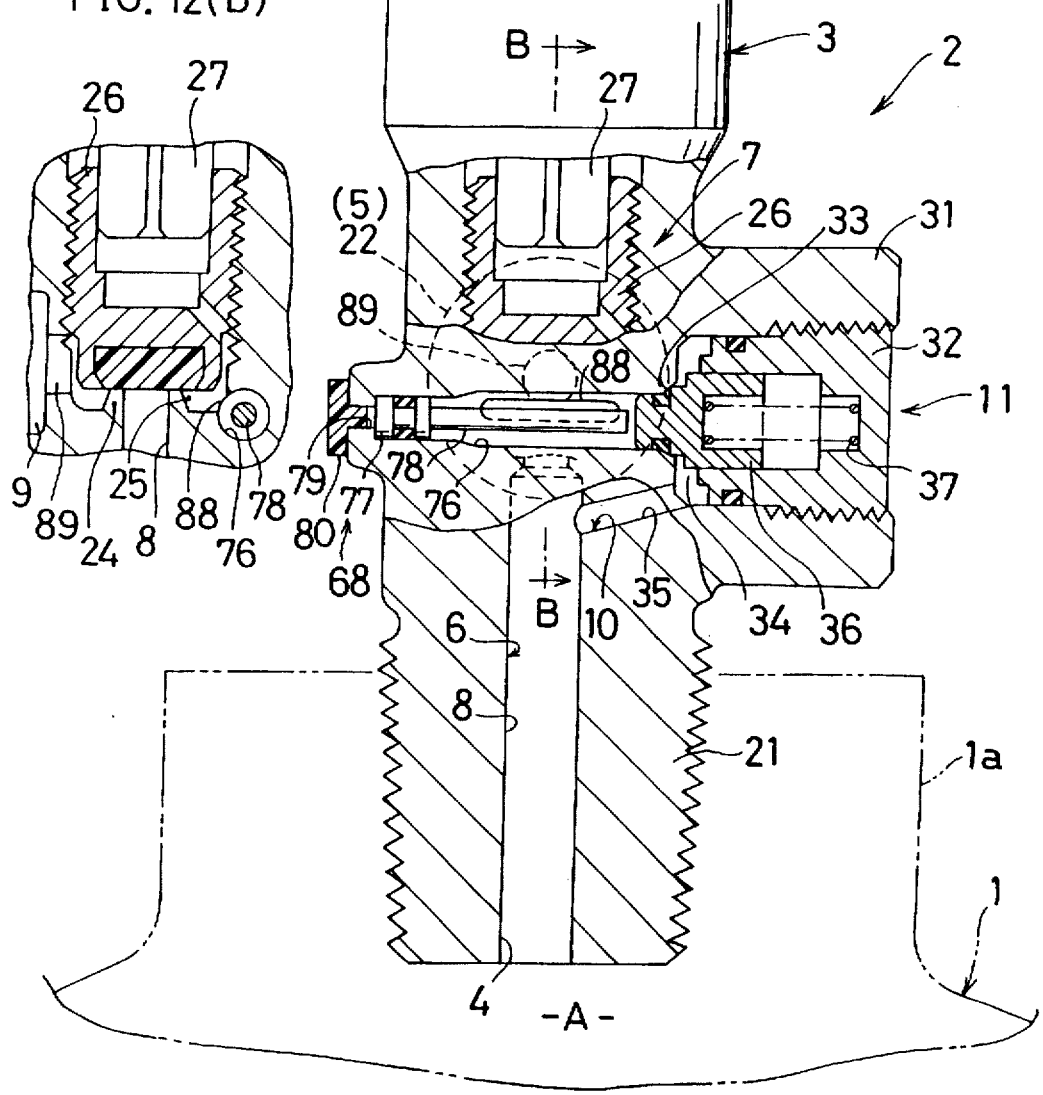
FIG. 12(a) shows a ninth embodiment of a valve assembly thereof and is a view corresponding to FIG. 1.
FIG. 12(b) is a sectional view taken along the B—B line in FIG. 12(a)

FIG. 12 shows the ninth embodiment and shows such a valve assembly as obtained by adding another forcible valve opening means 68 to the valve assembly of FIG. 1. FIG. 12(a) is a vertical sectional view and FIG. 12(b) is a sectional view taken along the B—B line in FIG. 12(a).

In this case, the outlet nozzle 22 is formed in a back portion of the valve casing 3, and the cylinder bore 76 and the communication port 79 of another forcible valve opening means 68 are formed at a midway height portion of the front section of the valve casing 3. Incidentally, the cylinder bore 76 and the stop valve chamber 25 are communicated with each other through a groove 88. The outlet passage 9 within the outlet nozzle 22 is communicated with the stop valve chamber 25 through a port 89, and the second check valve (not illustrated) similar to that of FIG. 1 is mounted to the outlet passage 9.

Incidentally, above-mentioned forcible valve opening means 68 is applicable to the valve assembly of the sixth embodiment (refer to FIGS. 7 and 8) and so on.

FIGS. 13 through 17 show a first variant example through a fifth variant example according to the respective above-mentioned embodiments respectively and system diagrams corresponding to FIG. 2. Incidentally, in the respective variant examples will be explained by designating component members having the same constitutions as those in FIG. 2 with the same symbols.

Figure 13:
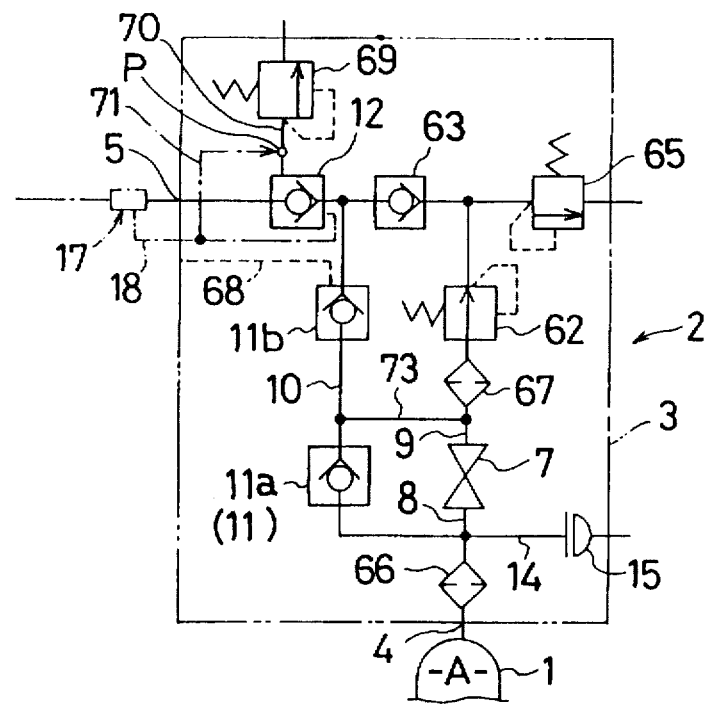
FIG. 13 shows a first variant example of the valve assembly of the above-mentioned respective embodiments and is a view corresponding to FIG. 2.

As shown in the system diagram of FIG. 13, the stop valve 7 and a pressure reducing valve 62 are arranged orderly between the gas inlet 4 and the gas outlet 5, the gas charging passage 10 are disposed in parallel to these stop valve 7 and the pressure reducing valve 62, and the first check valve 11 is mounted to the gas charging passage 10. The first check valve 11 is provided with two check valves 11a, 11b connected to each other in series. A passage portion between these check valves 11a, 11b and a passage portion between the stop valve 7 and the pressure reducing valve 62 are connected to each other by a branch passage 73. The second check valve 12 for holding the residual pressure is disposed between the gas outlet 5 and the check valve 11b as well as the pressure reducing valve 62. The gas flow from the second check valve 12 to the pressure reducing valve 62 is blocked by a third check valve 63.

The forcible valve opening means 18 for forcibly opening the second check valve 12 is arranged in the gas charging mouthpiece 17 to be connected to the gas outlet 5. Another forcible valve opening means 68 for forcibly opening the other check valve 11b is arranged in the valve casing 3. A filter 66 for the valve assembly is arranged between the gas inlet 4 and an inlet of the stop valve 7, and a primary filter 67 for the pressure reducing valve is arranged on the inlet side of the pressure reducing valve 62.

The primary safety valve 15 is arranged in the relief passage 14 branched out from the inlet passage 8 of the stop valve 7. A safety valve 65 on the reduced pressure outlet side is arranged between the pressure reducing valve 62 and the third check valve 63. Further, a gas inducing passage 70 of a secondary safety valve 69 is communicated with the gas outlet 5 and has an opening and closing portion P arranged therein. This opening and closing portion P is adapted to be closed by an actuating portion 71 formed in the forcible valve opening means 18 of the gas charging mouthpiece 17.

The valve assembly 2 is used as follows. Incidentally, the gas cylinder 1 is charged with the high-pressure gas whose pressure is about 300 kgf/cm$^2$ which is two times a conventional charge pressure (about 150 kgf/cm$^2$).

When the stop valve 7 is opened at the time of taking out of the gas, the high-pressure gas within the gas cylinder 1 is reduced to a predetermined pressure by the pressure reducing valve 62. After that, the gas can be taken out from the gas outlet 5 through the third check valve 63 and the second check valve 12 in order.

During this taking-out of the gas, even when the pressure of the gas outlet 5 is abnormally increased by a gas leakage from the check valve 11b which might be caused by intrusion of foreign material and so on, the abnormal pressure is released from the secondary safety valve 69. Further, even when the pressure of the gas outlet 5 is abnormally increased by such reasons as intrusion of foreign material into the pressure reducing valve 62 and so on, the abnormal pressure is released from the secondary safety valve 69 or the safety valve 65 on the reduced pressure outlet side.

Incidentally, when a relief capacity of the secondary safety valve 69 is set to a sufficient value, the safety valve 65 on the reduced pressure outlet side may be omitted.

During the taking-out of the gas, when the reversely flowing gas enters the gas outlet 5 by any reason, the reverse flow is blocked by the second check valve 12 to prevent the interior of the gas cylinder 1 from being contaminated by the reversely flowing gas.

When the residual pressure within the gas cylinder 1 is decreased to a predetermined pressure by repetition of the gas taking-out, the third check valve 63 is automatically closed by a spring (herein, not illustrated) as well as also the second check valve 12 is automatically closed by a spring (herein, not illustrated). Thereby, further gas taking-out is prevented, so that the residual pressure within the gas cylinder 1 is maintained at the predetermined pressure. As a result, even when the stop valve 7 is kept open by mistake, it can be prevented that the atmosphere enters the vacant gas cylinder 1.

When the high-pressure gas is charged into the vacant gas cylinder 1, firstly the gas charging mouthpiece 17 is connected to the gas outlet 5. Thereupon, the second check valve 12 is opened by a manual operation (or a pressure of the charge gas) through the forcible valve opening means 18 mounted to the mouthpiece 17. Simultaneously with the connection of the mouthpiece 17, an opening and closing portion P of a gas inducing passage 70 of the secondary safety valve 69 is closed by an actuating portion 71 formed in the mouthpiece 17. Subsequently, the high-pressure charge gas is supplied from the gas charging mouthpiece 17 under the closed condition of the stop valve 7. Thereupon, the charge gas passes from the gas outlet 5 through the second check valve 12 and the first check valves 11b, 11a in order and then the gas cylinder 1 is charged with the gas through the gas inlet 4.

By the way, at the time of gas charging, while the stop valve 7 is opened, the gas cylinder 1 is charged with the gas through the above-mentioned route and also through the branch passage 73 and the stop valve 7 in order.

At the time of this gas charging, since the opening an closing portion P is in the closed state, the high-pressure charge gas supplied to the gas outlet 5 doesn't enter the secondary safety valve 69. Therefore, the blowing-out of the charge gas from the secondary safety valve 69 can be prevented.

When the vacuum suction for the gas cylinder 1 is carried out prior to the gas charging, the second check valve 12 and the stop valve 7 are to be opened and the other first check valve 11b is to be opened by the forcible valve opening means 68.

Incidentally, when the gas within the gas cylinder 1 is taken out in the high-pressure state, the check valve 11b is opened by the forcible valve opening means 68 and the stop valve 7 is opened. Thereupon, the high-pressure gas within the gas cylinder 1 is taken out from the gas outlet 5 through the stop valve 7, the check valve 11b and the second check valve 12.

In this first variant example, since the first check valve 11 comprises the two check valves 11a, 11b connected to each other in series, the gas within the interior space A of the gas cylinder 1 can be prevented more reliably from leaking to the gas outlet 5 through the gas charging passage 10 while being stored within the gas cylinder 1 with the stop valve 7 closed.

Figure 14:
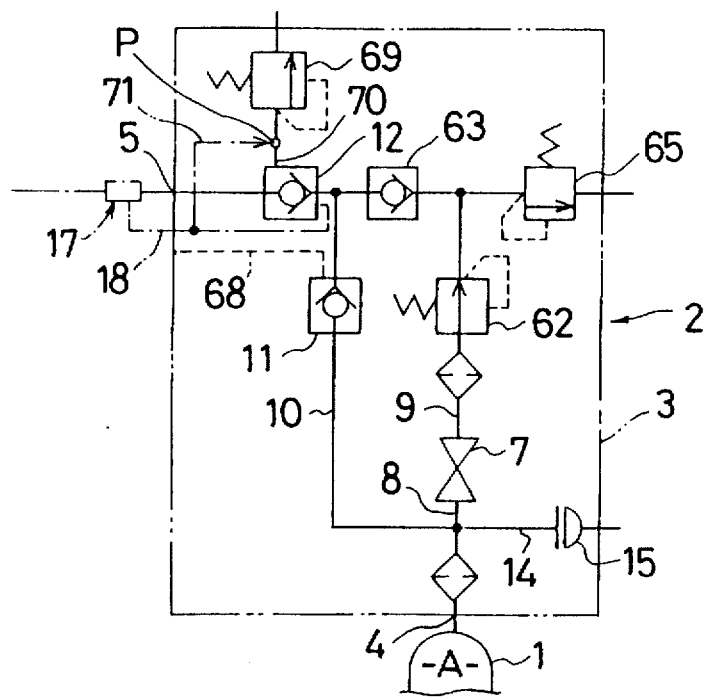
FIG. 14 shows a second variant example of the valve assembly thereof and is a view corresponding to FIG. 2.

This second variant example is obtained by simplifying the above-mentioned first variant example as shown in FIG. 14. That is, only one first check valve 11 is arranged in the gas charging passage 10 and other constitutions and operations are the same as those in the first variant example.

Incidentally, when the vacuum suction for the gas cylinder 1 is carried out prior to the gas charging, the first check valve 11 may be opened by another forcible valve opening means 68.

When the gas within the gas cylinder 1 is taken out in the high-pressure state, the first check valve 11 is opened by the forcible valve opening means 68 to take out the high-pressure gas within the gas cylinder 1 from the gas outlet 5 through the first check valve 11 and the second check valve 12.

Figure 15:
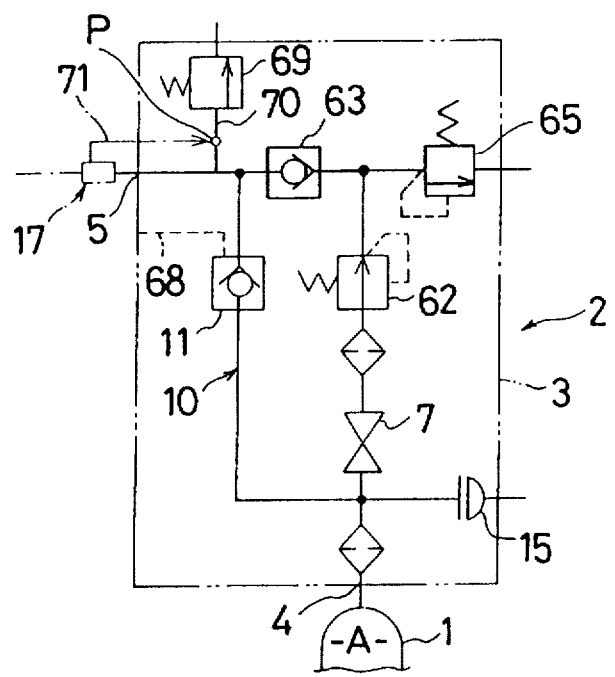
FIG. 15 shows a third variant example of the valve assembly thereof and is a view corresponding to FIG. 2.

This third variant example is obtained, as shown in FIG. 15, by omitting the second check valve 12 in FIG. 14. The holding of the residual pressure within the gas cylinder 1 is attained by a spring (herein, not illustrated) of the third check valve 63. The confirming of the pressure within the gas cylinder 1 is carried out by opening the first check valve 11 with the forcible valve opening means 68. Other constitutions and operations are the same as those in the case of FIG. 13 or FIG. 14.

Figure 16:
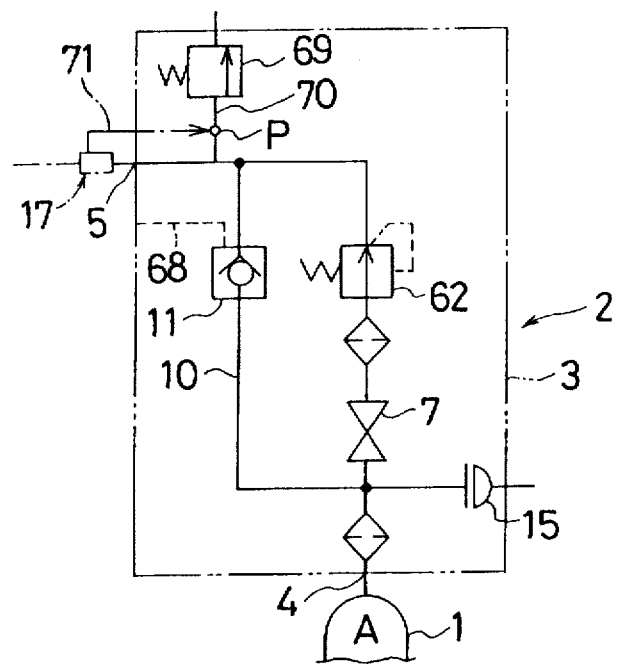
FIG. 16 shows a fourth variant example of the valve assembly thereof and is a view corresponding to FIG. 2.

This fourth variant example is obtained, as shown in FIG. 16, by omitting the third check valve 63 and the safety valve 65 on the reduced pressure outlet side in FIG. 15. Thereby, the constitution of the valve assembly 2 can be simplified remarkably. Other constitutions and operations are the same as those in the case of FIGS. 13 through 15.

Figure 17:
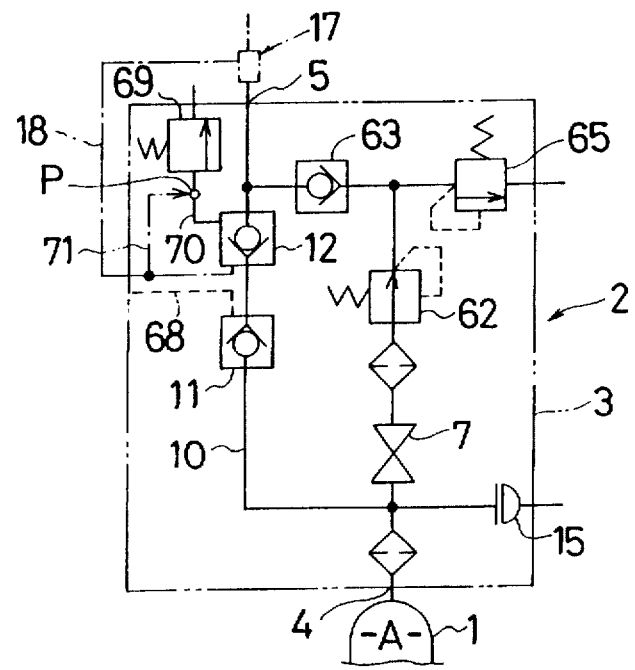
FIG. 17 shows a fifth variant example of the valve assembly thereof and is a view corresponding to FIG. 2.

This fifth variant example is obtained, as shown in FIG. 17, by arranging the second check valve 12 between an inlet portion of the gas charging passage 10 and the first check valve 11. In this case, since the residual pressure can be held only by a spring (not illustrated) of the third check valve 63, the residual pressure can be made smaller in comparison with the first variant example of FIG. 13 and the second variant example of FIG. 14. Other constitutions and operations are the same as those in the case of FIG. 13 or FIG. 14.

The above-mentioned respective embodiments can be further modified.

The opening and closing means 29 may be such a one as provided with an actuaters such as an air cylinder or an electric motor instead of the manually operated one.

The stop valve 7 may be constituted by a valve of the metallic diaphragm type or a ball valve instead of the seat valve type.

As many different embodiments of the invention will be obvious to those skilled in the art, some of which have been disclosed or referred to herein, it is to be understood that the specific embodiments of the invention as presented herein are intended to be by way of illustration only and are not limiting on the invention, and it is to be understood that such embodiments, changes, or modifications may be made without departing from the spirit and scope of the invention as set forth in the claims appended hereto.

What is claimed is:

1. A valve assembly for a gas cylinder comprising:
   a valve casing (3) within which a stop valve (7) including a stop valve closure (26) in a stop valve chamber (25) is arranged between a gas inlet (4) and a gas outlet (5), the gas outlet (5) being suitable for attaching a gas charging mouthpiece (17);
   a gas charging passage (10) adapted to communicate the gas outlet (5) with an interior space (A) of a gas cylinder (1) and arranged in parallel to the stop valve (7); and
   a first check valve (11) arranged in the gas charging passage (10) and serving to normally block a flow from the interior space (A) of the gas cylinder (1) to the stop valve chamber (25) and the gas outlet (5); and
   a second check valve (12) disposed between the first check valve (11) and the outlet (5) serving to normally block a flow from the outlet (5) to the stop valve chamber (25) and the first check valve (11).

2. A valve assembly for a gas cylinder as set forth in claim 1, wherein a pressure reducing valve (62) is arranged between the stop valve (7) and the gas outlet (5), and the first check valve (11) is arranged in parallel to the stop valve (7) and the pressure reducing valve (62).

3. A valve assembly for a gas cylinder as set forth in claim 1, wherein there is provided means (68) for forcibly opening the first check valve (11).

4. A valve assembly for a gas cylinder as set forth in claim 3, wherein the forcible valve opening means (68) comprises a cylinder bore (76) formed in series relative to a check valve chamber (34) and a check valve seat (33) of the first check valve (11) and a piston (77) hermetically inserted into the cylinder bore (76), and one end surface of the piston (77) is made to face a checking member (36) of the first check valve (11) and the other end surface of the piston (77) is made to face an outside space of the valve casing (3) through the cylinder bore (76).

5. A valve assembly for a gas cylinder comprising:
   a valve casing (3) within which a gas inlet (4) is communicated with a gas outlet (5) through an inlet passage (8), a stop valve seat (24), a stop valve chamber (25) and an outlet passage (9) in order, the gas outlet (5) being suitable for attaching a gas charging mouthpiece (17);
   an opening and closing means (29) adapted to open and close a stop valve closure (26) extending into the stop valve chamber (25) with respect to the stop valve seat (24);
   a gas charging passage (10) adapted to communicate the outlet passage (9) with an interior space (A) of a gas cylinder (1) and arranged in parallel to the stop valve seat (24);
   a first check valve (11) arranged in the gas charging passage (10) and serving to normally block a flow from the interior space (A) of the gas cylinder (1) to the outlet passage (9) and into the stop valve chamber (25); and
   a second check valve (12) disposed between the first check valve (11) and the gas outlet (5) serving to normally block a flow from the gas outlet (5) to stop valve seat (24), the stop valve chamber (25), and the first check valve (11).

6. A valve assembly for a gas cylinder as set forth in claim 5, wherein the first check valve (11) is arranged in parallel with the stop valve seat (24) between the stop valve chamber (25) and the inlet passage (8).

7. A valve assembly for a gas cylinder as set forth in claim 6, wherein a boss portion (31) is projected from a peripheral wall of the stop valve chamber (25) and the first check valve (11) is mounted to the boss portion (31), a portion of the valve casing (3) is enlarged from the peripheral wall of the stop valve chamber (25) substantially in the opposite direction to the projecting direction of the boss portion (31) so that the outlet passage (9) is formed in the enlarged portion (3a), said second check valve (12) being mounted to a midway portion of the outlet passage (9) and including a checking spring (42) normally biasing said second check valve (12) towards a normally closed position, such that when a pressure of the interior space (A) of the gas cylinder (1) exceeds a predetermined value, said second check valve (12) is opened by that pressure against the checking spring (42) and when the pressure falls to the predetermined value, said second check valve (12) is closed automatically by the checking spring (42).

8. A valve assembly for a gas cylinder as set forth in claim 5, wherein the first check valve (11) is arranged in parallel with the stop valve seat (24) between the outlet passage (9), the stop valve chamber (25), and the inlet passage (8).

9. A valve assembly for a gas cylinder as set forth in claim 5, wherein the gas charging passage (10) is arranged in parallel with the inlet passage (8) and the first check valve (11) is arranged in the end portion (10a) of the gas charging passage (10).

10. A valve assembly for a gas cylinder as set forth in claim 5, wherein a boss portion (31) is projected from a peripheral wall of the stop valve chamber (25) and the first check valve (11) is mounted to the boss portion (31), a portion of the valve casing (3) is enlarged from the peripheral wall of the stop valve chamber (25) substantially in the opposite direction to the projecting direction of the boss portion (31) so that the outlet passage (9) is formed in the enlarged portion (3a), said second check valve (12) being mounted to a midway portion of the outlet passage (9) and including a checking spring (42) normally biasing said second check valve (12) towards a normally closed position, such that when a pressure of the interior space (A) of the gas cylinder (1) exceeds a predetermined value, said second check valve (12) is opened by that pressure against the checking spring (42) and when the pressure falls to the predetermined value, said second check valve (12) is closed automatically by the checking spring (42).

11. A valve assembly for a gas cylinder as set forth in claim 5, wherein there is provided means (68) for forcibly opening the first check valve (11).

12. A valve assembly for a gas cylinder as set forth in claim 11, wherein the forcible valve opening means (68) comprises a cylinder bore (76) formed in series relative to a check valve chamber (34) and a check valve seat (33) of the first check valve (11) and a piston (77) hermetically inserted into the cylinder bore (76), and one end surface of the piston (77) is made to face a checking member (36) of the first check valve (11) and the other end surface of the piston (77) is made to face an outside space of the valve casing (3) through the cylinder bore (76).

* * * * *